United States Patent [19]

Saad-Cook

[11] Patent Number: 4,832,453

[45] Date of Patent: May 23, 1989

[54] COMBINATION DECORATIVE LIGHT IMAGE SOURCE AND CALENDRICAL DEVICE

[76] Inventor: Janet Saad-Cook, 1204 S. Washington St., Apt. 817-W, Alexandria, Va. 22314

[21] Appl. No.: 944,501

[22] Filed: Dec. 17, 1986

Related U.S. Application Data

[63] Continuation-in-part of Ser. No. 755,659, Jul. 8, 1985.

[51] Int. Cl.$^4$ .......................... G02B 27/00; B32B 3/10

[52] U.S. Cl. ....................................... 350/321; 40/431; 362/811; 428/141

[58] Field of Search ............... 350/321, 420, 144, 629, 350/630; 362/806, 811; 272/8 P, 10; 40/431; 428/13, 14, 141, 187, 542.6

[56] References Cited

U.S. PATENT DOCUMENTS

| | | | |
|---|---|---|---|
| 3,538,323 | 11/1970 | Ziegler . | |
| 3,585,379 | 6/1971 | Yamamoto et al. | 362/806 |
| 3,738,035 | 6/1973 | Bricker | 40/431 |
| 3,749,471 | 7/1973 | Mallard | 350/321 |
| 3,793,755 | 2/1974 | Gersch et al. | 40/431 |
| 3,803,398 | 4/1974 | Walker | 362/811 |
| 3,815,249 | 6/1974 | Gundlach . | |
| 4,310,370 | 1/1982 | Araï et al. | 428/141 |
| 4,338,727 | 7/1982 | Gundlach . | |
| 4,614,680 | 9/1986 | Fry et al. | 428/141 |

OTHER PUBLICATIONS

Mearl Corporation Technical Film Division Sheet No. TIB-6 "Technical Information: Mearl Iridescent Films General Information"(Jun. 1981).

"Laser Optics and Coatings" (CVI Laser Corp., no date), front and back cover and p. 39.

*Primary Examiner*—Bruce Y. Arnold
*Assistant Examiner*—Loha Ben
*Attorney, Agent, or Firm*—Mason, Fenwick & Lawrence

[57] ABSTRACT

A combination decorative light image source and calendrical device comprising a substantially planar platform, a light-reflective material affixed to the top surface of the platform, and a second material positioned above the light-reflective material for reflecting, transmitting, and refracting light. The second material can comprise a flexible film arranged in a plurality of at least partially spaced-apart planes or a rigid, transparent material which is bent and is colored or has a dielectric coating. A transparent cover can be affixed to the platform for enclosing the top surface of the platform, the light-reflective material, and the flexible film and a base can be attached to the bottom surface of the support surface for rotating the support surface in a plurality of planes. In another embodiment, the combination decorative light image source and calendrical device comprises a first rigid material for reflecting light, and a second rigid material for reflecting, transmitting, and refracting light. The first and second rigid materials are attached to a support surface by mounting members which include angling and rotating mechanisms for changing the positions of the materials. If the support surface is a platform, a base can be attached to the bottom surface of the platform for rotating the support surface in a plurality of planes.

64 Claims, 5 Drawing Sheets

FIG. 1
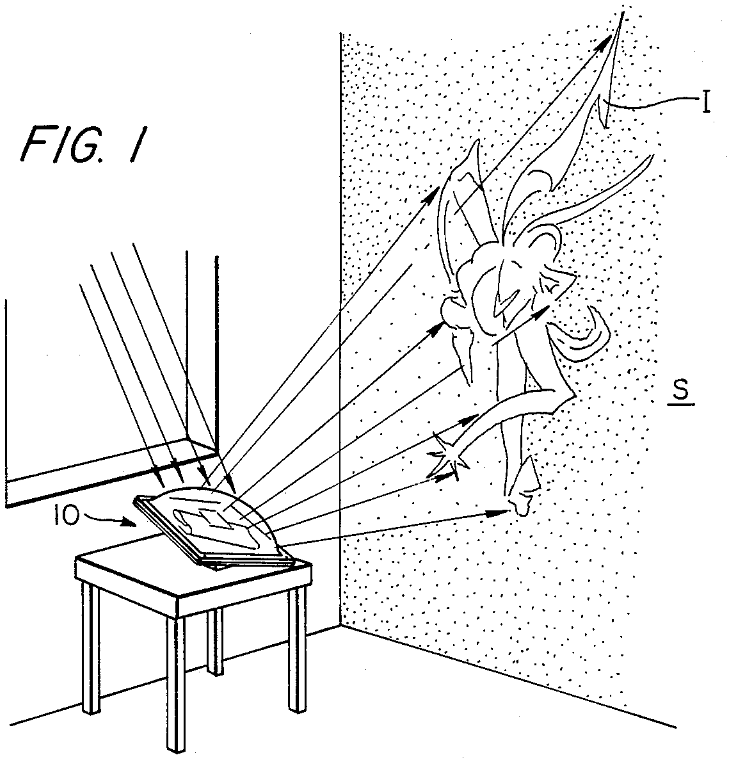
FIG. 6
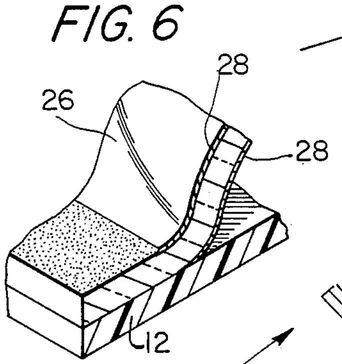
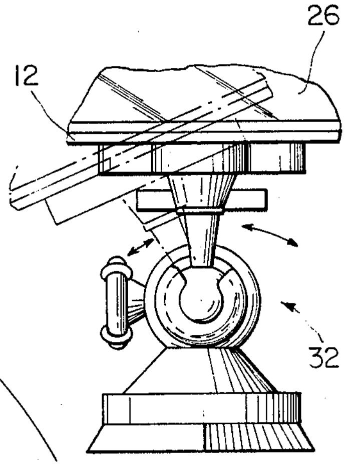
FIG. 3
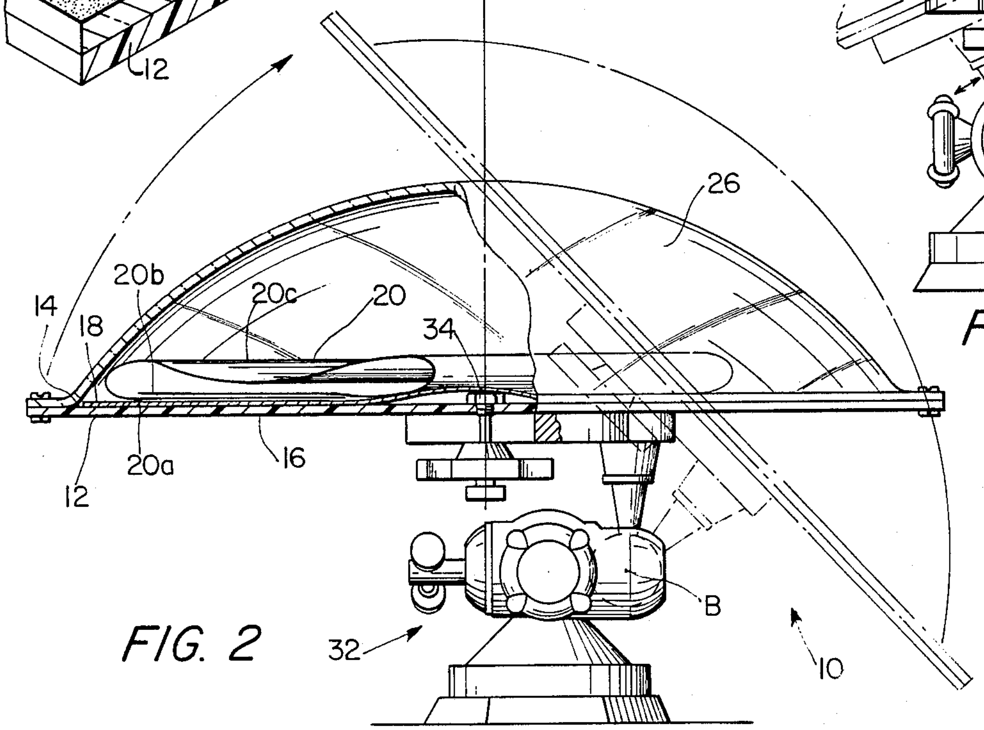
FIG. 2

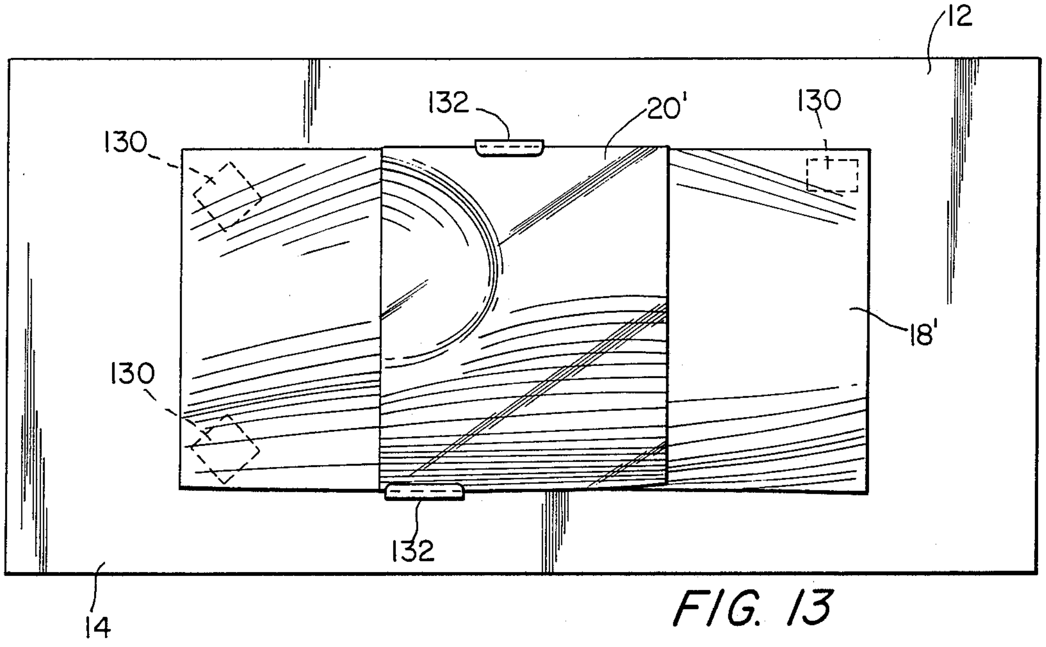
FIG. 13
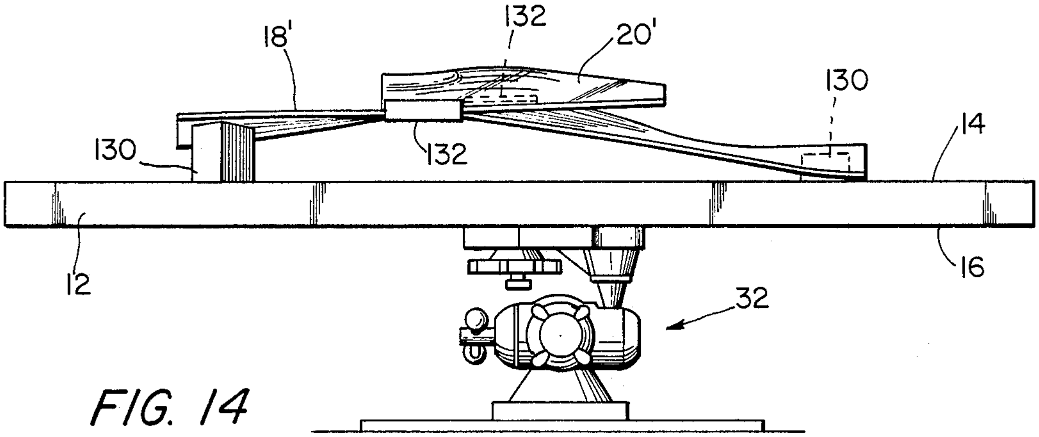
FIG. 14
FIG. 15
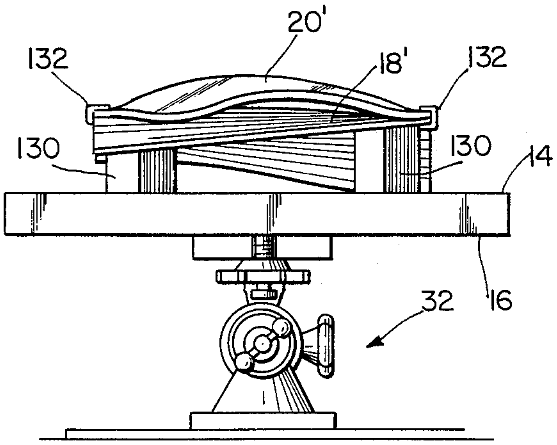
FIG. 16
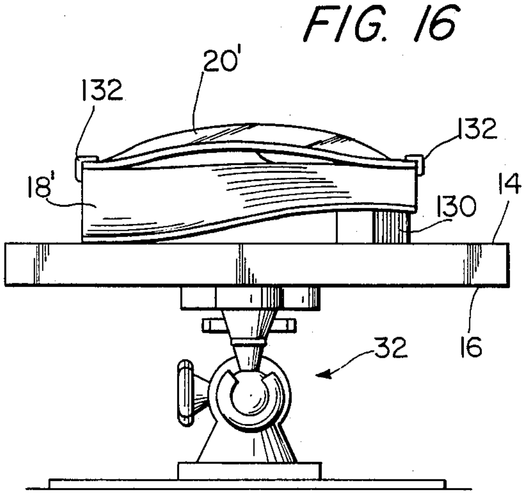

COMBINATION DECORATIVE LIGHT IMAGE SOURCE AND CALENDRICAL DEVICE

This application is a continuation-in-part of Ser. No. 755,659, filed July 8, 1985.

BACKGROUND OF THE INVENTION

This invention is in the field of both light sources and calendrical devices, and more specifically in the field of light sources for forming decorative light images, and devices which use sunlight to indicate the time of day and year.

Many kinds of calendrical devices which employ the sun, i.e., sun dials, are known. Most sundials operate by casting a shadow on a scale which indicates the time of day or year. However, some sundials operate by actually focusing the sunlight or forming an image of sunlight on a scale, from which the time of day can be determined. Such sundials are characterized by U.S. Pat. Nos. 3,815,249 and 4,338,727 to Gundlach. A related device is characterized by U.S. Pat. No. 2,668,357 to Whipple. Whipple teaches a device for measuring the length of sun exposure and is built up of lens-like structures which form a spot of light on a scale as the sun passes across the sky.

Although the sundial disclosed in Gundlach U.S. Pat. No. 3,815,249 is supported on a latitude ring which is adjustable to allow the axis of the sundial to be parallel with the earth's rotational axis, none of the above-described devices allow for the position of the light-catching mechanism to be adjusted to compensate for the changing position of the sun over the course of the year. Moreover, the above-described devices have extremely limited aesthetic appeal. The appearance of the devices themselves is dictated solely by utilitarian considerations, and the light image formed is only a small spot focused on the time scale.

There are also numerous devices known which are usable as a decorative light source. Many of these utilize artificial light, and are characterized by U.S. Pat. Nos. 1,984,986 to Prouty, 3,538,323 to Ziegler, 3,585,379 to Yamamoto et al., 3,783,035 to Bricker, 3,793,755 to Gersch et al., and 3,803,398 to Walker. Prouty teaches a display device comprising luminous tubing supported over a mirror for creating a specular image. Ziegler teaches a decorative light source in which light from a lamp passes through a rotating, multi-colored filter wheel and is then reflected by a rotating, contoured mirror. Yamamoto et al. teach a lighting fixture in which a bladed rotor is mounted above a bulb in an opaque hollow tube for producing a flamelike flickering light. Bricker teaches a lighted display in which light transmissive members are rotatably mounted over a light bulb to create intermittently pulsed streaks of light. Gersch et al. teach apparatus for producing moving light patterns comprising a light bulb, a rotatable light transmitting member having a multiplicity of light transmitting surfaces which receive light from the light bulb, and a multi-colored, rotatable, light-transmitting wheel mounted between the light bulb and the member. Walker teaches a lightbulb and a plurality of optical fibers bunched together at one end over the bulb for creating a light effect at the unbunched end. Because these devices are usable only with artificial lighting, they cannot be used for calendrical purposes.

Reflection and dispersion as taught by Ziegler have also been used, however, with natural sunlight, as described in U.S. Pat. No. 354,440 to Schoenberg. Schoenberg teaches an "incidence window" for indirectly lighting a room by reflecting sunlight through lenses and prisms. However, because the purpose of Schoenberg's window is lighting a room, the lenses and prisms are set up to fully diffuse the light, rather than to create a decorative light pattern. U.S. Pat. No. 3,068,754 to Benjamin teaches a related device, a light-transmitting ceiling panel comprising clusters of prisms for creating a fully-diffused pattern of light, substantially free from glare, from an artificial light source positioned above the ceiling panel. Thus, although Schoenberg and Benjamin both use the phenomena of diffusion, reflection, and dispersion of light, they do so in a manner which precludes a creation of decorative light images and any indication of the sun's movement. It is the solution of these and other problems to which the present invention is directed.

Therefore, it is the primary object of this invention to provide a combination decorative light image source and calendrical device which, upon exposure to direct sunlight, forms decorative light images for indicating the time of day and year.

It is another object of this invention to provide a decorative light image source and calendrical device which can be adjusted to place the light-catching mechanism to take into account the changing position of the sun throughout the year.

It is still another object of this invention to provide a decorative light image source and calendrical device which can create a decorative light image using artificial light when direct sunlight is not available.

SUMMARY OF THE INVENTION

These and other objects of the invention are achieved through the employment of a combination decorative light image source and calendrical device comprising a substantially planar platform, a light-reflective material affixed to the top surface of the platform and a light-reflective, transmissive, and refractive material positioned above the light-reflective material for reflecting, transmitting, and refracting light.

The light-reflective, transmissive, and refractive material can be a flexible film or a piece of rigid, transparent material such as glass or plastic having a dielectric coating, or stained glass. Where a flexible film is used, it is preferably arranged in a plurality of at least partially spaced-apart planes, and a transparent cover is affixed to the platform for enclosing the top surface of the platform, the light-reflective material, and the light-reflective, transmissive, and refractive material. In one aspect of the invention, the light-reflective material is a plastic. In another aspect of the invention, the light-reflective material is a metal having a shiny surface. A light-reflective and transmissive material can be at least partially interposed between the flexible film and the light-reflective material. The flexible film comprises a plurality of microlayers of at least two different polymers having different indices of refraction. A base can be attached to the bottom surface of the support surface for rotating the support surface in a plurality of planes.

In another embodiment, the combination decorative light image source and calendrical device comprises a first rigid material for reflecting light, and a second rigid material for reflecting, transmitting, and refracting light. In one aspect of this embodiment of the invention, the first and second rigid materials are mounted to a support surface, such as a wall or a platform, by mounting members including rotating and angling mechanisms. The first material is a metal having a shiny surface. The second material is a plastic or glass treated to reflect, transmit, and refract light. If a platform is used, a base can be attached to the bottom surface of the platform for rotating the support surface in a plurality of planes.

A better understanding of the disclosed embodiments of the invention will be achieved when the accompanying detailed description is considered in conjunction with the appended drawings, in which like reference materials are used for the same parts as illustrated in the different figures.

BRIEF DESCRIPTION OF THE DRAWINGS

FIG. 1 is a perspective view of a first embodiment of the invention in use with a source of direct sunlight, projecting a decorative light image;

FIG. 2 is a side elevational view of the embodiment of FIG. 1, partially cut away;

FIG. 3 is a side elevational view of the base of the embodiment of FIG. 1, rotated one-quarter turn from the view of FIG. 2;

FIG. 6 is a partial perspective view, partially cut away, of the cover and platform of the embodiment of FIG. 1, showing the coating on the cover;

FIG. 13 is a top plan view of the embodiment of FIG. 10;

FIG. 14 is a side elevational view of the embodiment of FIG. 10;

FIG. 15 is a front elevational view of the embodiment of FIG. 10; and

FIG. 16 is a rear elevational view of the embodiment of FIG. 10.

DESCRIPTION OF THE PREFERRED EMBODIMENTS

Figure 5:
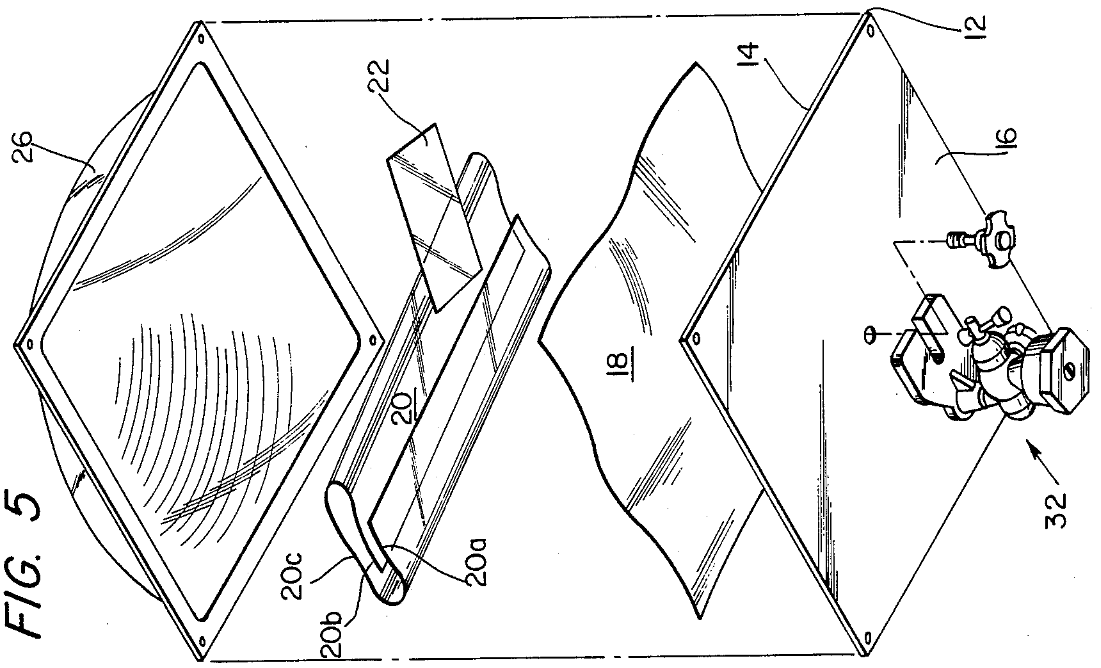
FIG. 5 is a partially exploded view of the embodiment of FIG. 1.

Referring now to FIGS. 1–6, there is illustrated a first embodiment of a combination decorative light image source and calendrical device 10 according to the present invention, in use in a direct source of natural light (sunlight) L, forming a decorative light image I on a surface S. Combination decorative light image source and calendrical device 10 comprises a substantially planar platform 12 having a top surface 14 and a bottom surface 16, a light-reflective material 18 affixed to top surface 14 of platform 12, a flexible film 20 positioned above light-reflective material 18, a light-reflective and transmissive material 22 affixed to light-reflective material 18, at least a portion 24 of which is positioned between light-reflective material 18 and flexible film 20, and a transparent cover 26 affixed to platform 12 for enclosing top surface 14 of platform 12, light-reflective material 18, flexible film 20, and light-reflective and transmissive material 22.

In order to create a decorative light image I, flexible film 20 is made from a material which reflects, transmits, and refracts light. In a preferred embodiment, commercially available iridescent film manufactured by the Mearl Corporation, Decorative Film Division, of Peekskill, N.Y., is used. This film contains more than 100 microlayers of at least two different polymers having different indices of refraction. One type of this film consists of 113 microscopic "optical" layers; another type of this film consists of 226 such microscopic "optical" layers. Both types of film consist of an "optical core" composed of alternating microlayers of two polymers of different refractive indices. The outer layer at each surface of the film is thicker than the individual microlayers. These outer or "skin" layers may consist of one of the two polymers making up the optical core, or of a third polymer. Typically, the outer layers are composed of polypropylene, impact modified acrylic, or polyester, while the optical core comprises alternating layers of ethylene vinyl acetate and polystyrene, or polyester and acrylic.

This film absorbs no light. Rather, the film structure separates white light into the colors of the spectrum, which change with the angle at which the film is seen. This phenomenon is cause by the two main optical characteristics of the film, namely, (1) for a fixed angle of illumination, the transparent film can display two colors, one seen by reflection from the film and a second color seen by transmission through the film, and (2) the observed colors are dependent on the angle of observation. The reflection color is seen at the specular (mirror) angle, where the angle of reflection is equal to the angle of incidence. In general, the reflection colors appear bright and more intense, while the transmission colors appear soft. The principle corresponding reflection and transmission colors are as follows:

| Reflection Color | Transmission Color |
|---|---|
| Red/Orange | Greenish Blue |
| Gold | Blue |
| Green | Magenta |
| Blue | Yellow |

Because the observed colors are dependent on the angle of observation, a film which, for example, reflects red light when viewed at right angles, becomes green and then blue as the viewing position moves further from the vertical. This shift in color with angle of observation is an inherent property of iridescence (light interference), and is responsible for the color play and variety when the invention is placed in a direct source of light, whether natural (sunlight) or artificial, which moves over time.

Color at any point in a film is determined by the predominant wavelength of the reflected light, which is given by the expression:

$$\lambda = \frac{2}{M}(n_1t_1 + n_2t_2)$$

where:

$\lambda$ is the reflected wavelength for light perpendicularly incident to the film, $t_1$ and $t_2$ are the layer thickness of polymers 1 and 2, $n_1$ and $n_2$ are the refractive indexes of polymers 1 and 2, and M is the order of the reflection, e.g., 1st, 2nd, etc.

The reflection of light off of the multiple layers also causes interference between lightwaves reflected from different layers, giving rise to interference patterns.

Figure 4:
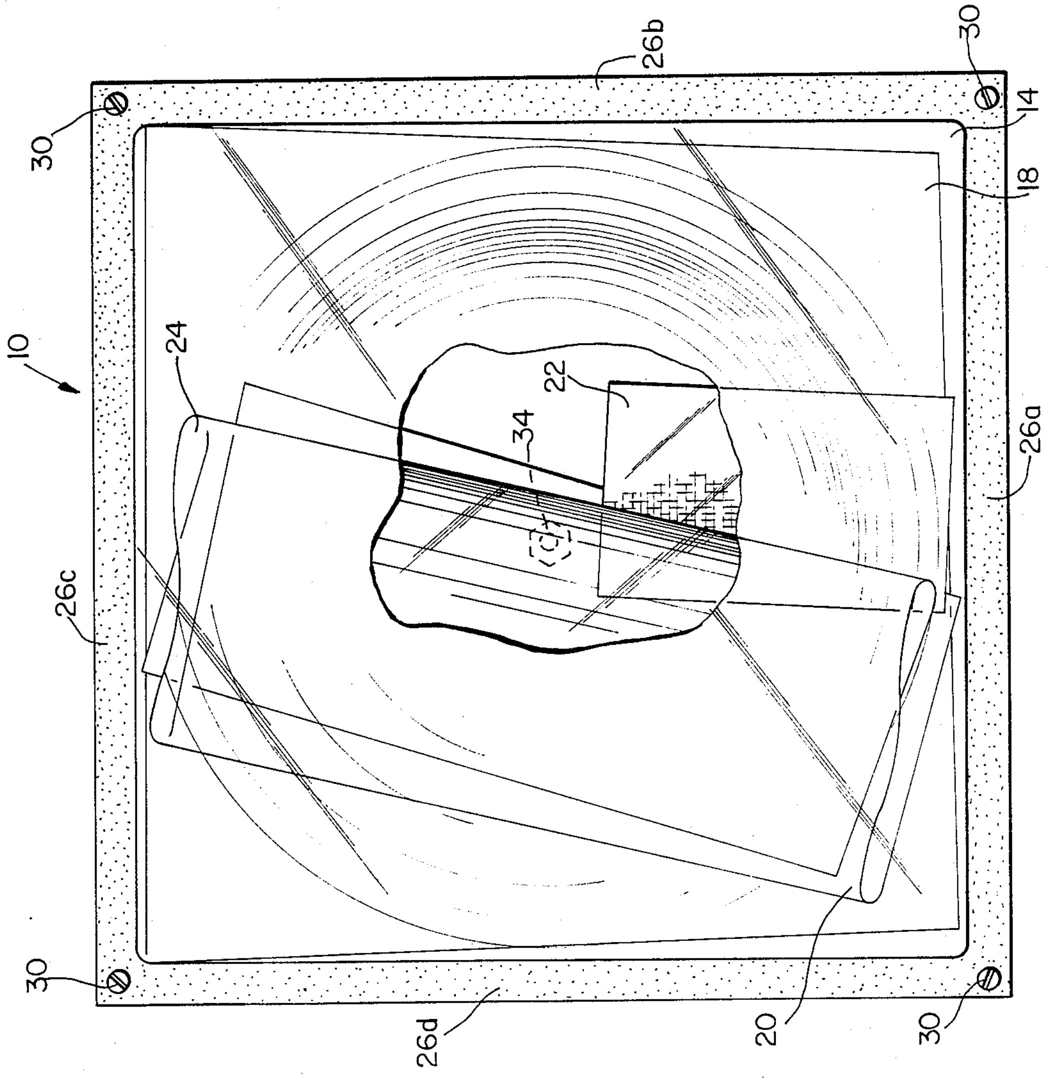
FIG. 4 is a top plan view of the embodiment shown in FIG. 1.

Referring particularly to FIGS. 2, 4, and 5, in order to enhance the optical characteristics of the film, its surface is arranged in a plurality of planes. One method of accomplishing this is to fold film 20 into two or more layers 20*a*, 20*b*, 20*c*, which are at least partially spaced apart. Thus, the various colors which appear with changing angles of observation are produced simultaneously. Also, when film 20 is arranged in this manner, parallel rays of incident sunlight passing through or reflected by the shallow curved surfaces as shown in FIGS. 2, 4, and 5 will remain nearly parallel, so that the reflected beam will maintain the brightness of the incident sunlight and will be confined to a definite area, thereby producing a bright, visible, focused image.

Light-reflective material 18 preferably is either a metal having a shiny surface or a plastic treated to have a shiny surface. The plastic can be either rigid or flexible. Metals can include steel, bronze, brass, aluminum, copper, tin, silver, silver plate, gold, and gold plate. Treated plastics include metalized polyester and lacquered polyvinyl chloride, with metalized polyester yielding the best results. A polyimide film such as Du Pont Kapton can also be used for light-reflective material 18. Kapton is synthesized by a poly-condensation reaction between an aromatic tetra-basic acid and an aromatic amine. Advantageously, it transmits, as well as reflects, light, and therefore is preferred for use as light-reflective and transmissive material 22.

Whether a metal or a treated plastic is used for light-reflective material 18, it must be formed with a planar surface bent to focus light. The bending must be controlled, or the reflected light image will spread out too much. The amount of bending determines how focused the final image I will be at a distance; the greater the amount of bending, the closer device 10 must be to surface S. Light-reflective and transmissive material 22 can be formed likewise. Thus, light transmitted through the flexible film 20 to light-reflective and transmissive material 22 and light-reflective material 18 will be focused as well as reflected. The result is that both diffused and focused light images will be formed by combination decorative light image source and calendrical device 10.

In practice, any one of the optical elements, flexible film 20, light-reflective material 18, or light-reflective and transmissive material 22, can be used alone to produce a decorative light image for indicating the passage of time. The most color and image variation is obtainable using flexible film 20, however, so that if only one of film 20 and materials 18 and 22 is to be used, it is preferable to use film 20. Also, a satisfactory light image can be formed using only film 20 and one of light-reflective material 18 or light-reflective and transmissive material 22.

Because of the generally flexible nature of the materials used for flexible film 20, light-reflective material 18, and light-reflective and transmissive material 22, a virtually infinite variety of light images can be created merely by changing their surface shapes. Yet, they are sufficiently rigid that their surface shapes can be approximately duplicated from one combination decorative light image source 10 to the next, so that approximately duplicate images I can be obtained. The metals used for light-reflective material 18 are particularly suitable for duplication, as multiple, identical metal sheets can be formed using well-known molding techniques.

Preferably, an adhesive is used to affix light-reflective material 18 to top surface 14 of platform 12, light-reflective and transmissive material 22 to light-reflective material 18, and flexible film 20 to light-reflective material 18 and/or light-reflective and transmissive material 22 (or to top surface 14 of platform 12, if flexible film 20 is used alone). Numerous adhesives have been found to produce satisfactory results, e.g., pressure sensitive adhesive, such as 3M ATG transfer tape; epoxy; hot glue; and rubber silicone.

Because flexible film 20 is preferably formed from a plastic material, it will readily attract dust and other small, atmospherically-born contaminants. A transparent cover 26 is therefore provided to enclose top surface 14 of platform 12, light-reflective material 18, flexible film 20, and light-reflective and transmissive material 22. Preferably, transparent cover 26 is dome-shaped and formed of thermoformed acrylic plastic sheet. However, other plastics and glass of suitable shape can be used. In the embodiment as illustrated, cover 26 is formed with planar edges 26*a*, 26*b*, 26*c*, 26*d* which are fastened to platform 12 by any conventional means, such as screws 30. Planar edges 26*a*, 26*b*, 26*c*, and 26*d* are sanded or otherwise treated to prevent reflection. The inner and outer surfaces of cover 26 are treated with an anti-reflective coating 28 (FIG. 6) in order to insure as complete a transmission as possible of light back and forth from light-reflective material 18, flexible film 20, and light-reflective and transmissive material 22. Preferably, a multi-layer broad band low-reflection coating, such as ECI #129 made by Evaporated Coatings, Inc., is used.

Preferably, platform 12 is formed of rigid acrylic plastic sheet or plastic laminate-covered wood, although any other suitable material can be used. In the embodiment illustrated, platform 12 is substantially square; however, other regular geometric shapes, e.g., rectangle, circle, oval, or even irregular shapes, are equally suitable.

Referring now to FIGS. 2 and 3, in order to enable combination decorative light source and calendrical device 10 to take maximum advantage of the available direct light, it preferably is provided with a base 32 attached to bottom surface 16 of platform 12 e.g., by a screw 34, for rotating platform 12 in at least one plane. For best results, base 32 should be capable of rotating platform 12 around a line A perpendicular to and passing through the plane of platform 12 and around a line B parallel to a line in the plane of platform 12. An example of such a base is a tripod head such as illustrated in FIGS. 2 and 3, such as that made by Gitzo, of Paris, France.

Combination decorative light image source and calendrical device 10 can be made in a variety of sizes, depending upon the intended use. A miniature tabletop model can be made having a width and length of only a few inches, while a large model for floor or outdoor use can be made having a width and length of between 1 and 2 feet, or even larger if desired. The size of base 32 is proportional to the size and weight of the remainder of combination decorative light image source and calendrical device 10.

Figure 7:
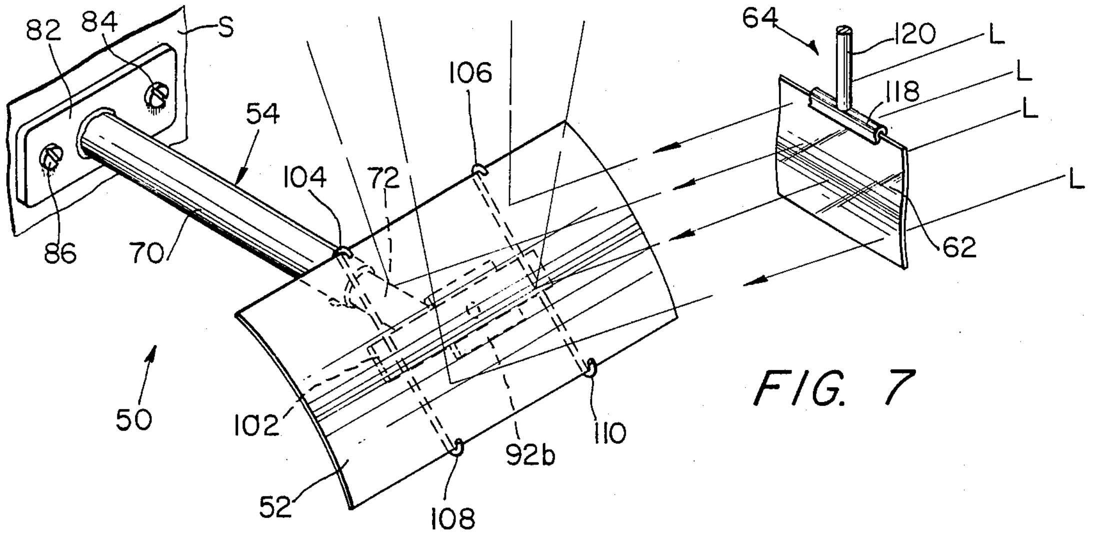
FIG. 7 is a perspective view of a second embodiment of the invention in use in a direct source of light.
Figure 8:
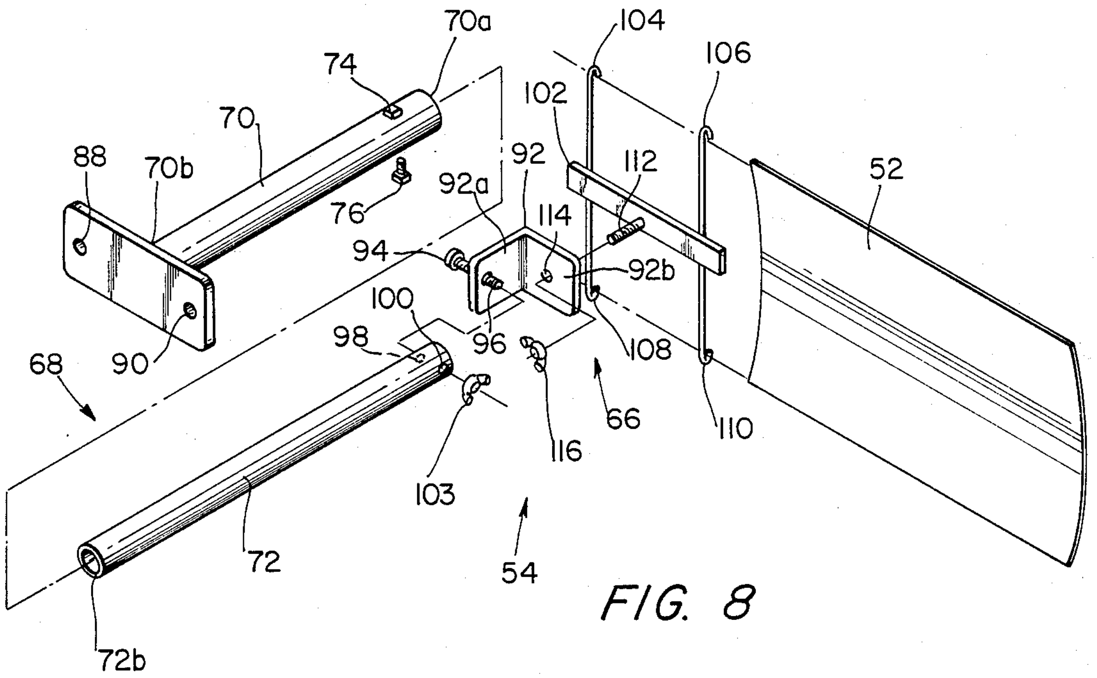
FIG. 8 is an exploded view of the reflective optical element and the mechanism for mounting the reflective optical element of the embodiment of FIG. 7.
Figure 9:
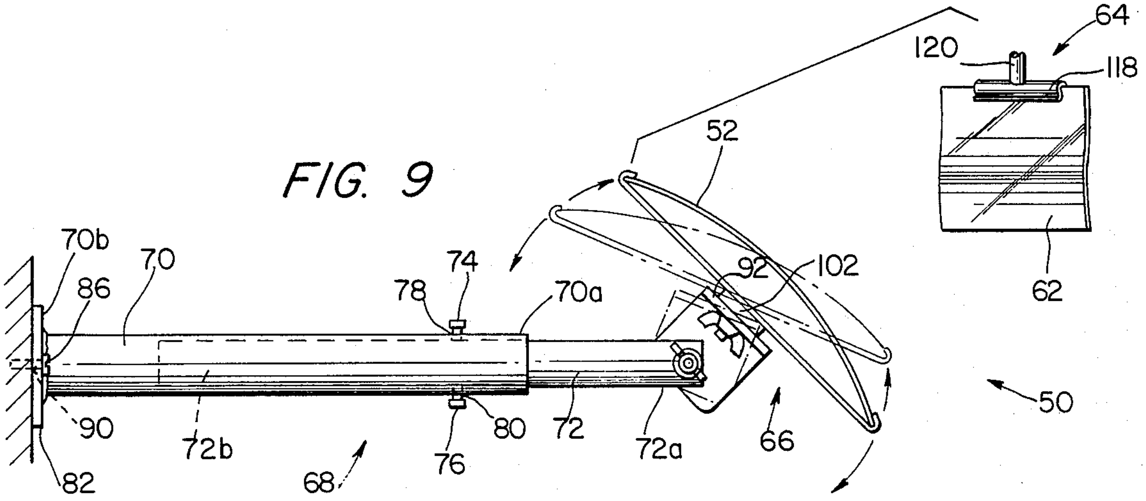
FIG. 9 is a side elevational view of the embodiment of FIG. 7.
Figure 10:
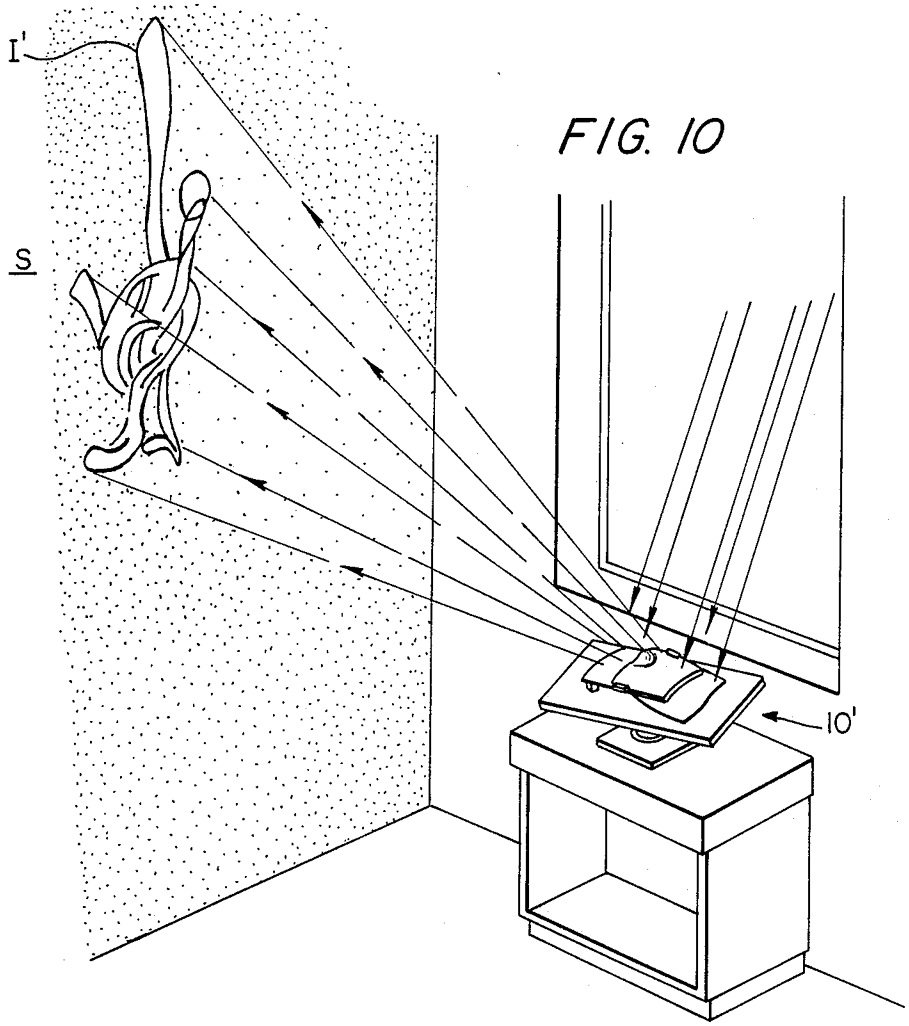
FIG. 10 is a perspective view of a third embodiment of the invention in use with a source of direct sunlight, projecting a decorative light image.

Referring now to FIGS. 7–9, there is illustrated a second embodiment of a combination decorative light image source and calendrical device 50 according to the present invention, positioned in a source of direct sunlight L. Combination decorative light image source and calendrical device 50 comprises a first rigid material 52 for reflecting light, a mounting member 54 for attaching first material 52 to a support surface SS, a second rigid material 62 for reflecting, transmitting, and refracting light, and a mounting member 64 for attaching second material 62 a support surface, preferably to mounting member 54, spaced apart from and over first material 52. Mounting member 64 can also be used to attach second material 62 to the same support surface SS to which first material 52 is attached. It is also possible to attach first material 52 to a different support surface from support surface SS to which first material 52 is attached. First and second materials 52 and 62 are so positioned with respect to each other that at least some of the light passing through second material 62 will impinge on first material 52.

In order to create a decorative light image (not shown), second material 62 is made from a material which reflects, transmits, and refracts light. Material 62 is rigid so that it can be suspended over first material 52. Materials which meet these requirements include, but are not limited to, dielectrically-coated glass, stained glass, architectural glass, pressed glass, blown glass, sagged glass, etched glass, cut glass, molded glass, thermoformed plastic, plastic sheet, colored plastic, etched plastic, pressed plastic, and dielectrically-coated plastic. Polished transparent stones, such as gem stones and semiprecious stones, can also be used. Where a glass or plastic material is used, it must be formed with a planar surface bent to focus light. Gem stones and semiprecious stones must be cut or shaped to focus light.

First material 52 preferably is a metal having a shiny surface. As with light-reflective material 18, such metals can include steel, bronze, brass, aluminum, copper, tin, silver, silver plate, gold, and gold plate. First material 52 is also rigid, so it can be suspended above its support surface. It is positioned at least partially beneath second material 62 to reflect the light transmitted by second material 62. First material 52 also can be formed with a planar surface bent to focus light, so that light transmitted through second material 62 will be focused as well as reflected. Thus, combination decorative light image source and calendrical device 50 will form both diffused and focused light images.

In practice, either of the optical elements, first material 52 or second material 62, can be used alone to create a decorative light image which will change with the motion of the sun.

The support surface on which first and second materials 52 and 62 are positioned can be a floor, a wall, a ceiling, the ground, or a platform such as platform 12 used in combination decorative light image source and calendrical device 10. Thus, first material 52 and second material 62 can be mounted directly to a support surface S such as a wall or floor using mounting members 54 and 64, respectively, or to a platform using mounting members 54 and 64 respectively. Use of a platform is preferable where it is desired that combination decorative light image source and calendrical device 50 be portable. Direct mounting is preferable where permanent installation is desirable, e.g., in a garden or other outdoor setting.

When a platform is used, it can be provided with a base such as base 32 used in combination decorative light image source and calendrical device 10.

Preferably, mounting member 54 comprises an angling mechanism 66 for rotating first material 52 in at least one plane and a sliding mechanism 68 for adjusting the height of retaining member 54 and rotating angling mechanism 66 about the longitudinal axis of sliding mechanism 68.

As illustrated in FIGS. 7–9, sliding mechanism 68 comprises an outer tube 70 having first and second ends **70*a* and 70*b*, an inner tube 72 having a first end 72*a* and a second end 72*b* slidably and rotatably received in first end 70*a* of outer tube 70 and a pair of setscrews 74 and 76 received in holes 78 and 80 in outer tube 70 for locking inner tube 72 in place with respect to outer tube 70. A plate 82 is attached to second end 70*b* of outer tube 70, e.g., by welding or brazing, by which mounting member 54 can be attached to support surface S, e.g., by screws 84 and 86 through holes 88 and 90 in plate 82**.

As further illustrated in FIGS. 7–9, angling mechanism 66 comprises an angle bracket 92 and a planar bracket 102. Angle bracket 92 has first and second sides **92*a* and 92*b*. A setscrew 94 received in a hole 96 in first side 92*a* of angle bracket 92 and corresponding opposed holes 98 and 100 in first end 72*a* of inner tube 72, and a wing nut 103 for tightening setscrew 94 are used to achieve rotation of angling mechanism 66 in a plurality of planes relative to the longitudinal axis of sliding mechanism 68. Planar bracket 102 has pairs of opposed fingers 104, 106, 108, and 110 extending from the ends thereof for grasping the edges of first material 52 and a threaded stud 112 extending from the center thereof. Stud 112 is received in a hole 114 in second side 92*b* of angle bracket 92 and is tightened with a wing nut 116. Stud 112 allows rotation of planar bracket 102 about the longitudinal axis of sliding mechanism 68**.

A number of sliding and angling mechanisms are known, and any of these can be used in place of angling mechanism 66 and sliding mechanism 68 to accomplish the functions of retaining first material 52 and positioning first material 52 with respect to support surface SS.

Second material 62 can be mounted to mounting member 54 or support surface SS using a mechanism similar to mounting member 54, or, as illustrated in FIGS. 7 and 9, using a single resilient clamping member 118 for grasping one edge of second material 62, and a bar 120 attached to clamping member 118 for adjustably mounting second material 62 to mounting member 54 or support surface SS. Again, a number of suitable mechanisms are known which can be used to retain second material 62 and adjustably attach it to mounting member 54 or support surface SS, or otherwise position it relative to first material 52, and any of these mechanisms can be used.

Because both mounting members 54 and 64 are adjustable, they can be used to position first and second materials with respect to each other and support surface SS, as well as with respect to the source of light L.

The structure of combination decorative light image source and calendrical device 50 is particularly suitable where it is desired to produce a number of identical units. This is because the glasses, plastics, and metals which are used for first and second materials 52 and 62 can be subjected to the kind of well-known molding techniques which are needed to produce multiple images identical in form. Also, because materials 52 and 62 are rigid, no protective dome is needed.

Referring now to FIGS. 10–16, there is illustrated a third embodiment of a combination decorative light image source and calendrical device 10' according to the present invention, in use in a direct source of natural light (sunlight) L, forming a decorative light image I' on a surface S. Combination decorative light image source and calendrical device 10' is similar to device 10 and comprises a substantially planar platform 12 having a top surface 14 and a bottom surface 16, a rigid light-reflective material 18' affixed above top surface 14 of platform 12, and a rigid, transparent, light-reflective, transmissive, and refractive material 20' positioned above light-reflective material 18'. Supporting means such as small wooden blocks 130 can be used to space at least a portion of light-reflective material 18' above top surface 14 of platform 12, epoxy or a similar adhesive being used to affix blocks 130 to top surface 14 and light-reflective material 18'. Brackets 132 or similar means of attachment are used to position light-reflective, transmissive, and refractive material 20' above light-reflective material 18'. Epoxy or a similar adhesive can also be used to fix brackets 132 in place, if necessary. Platform 12 is supported on a base 32.

Platform 12 and base 32 are substantially as described with respect to device 10. Light-reflective material 18' is a rigid metal or plastic having a shiny surface as described with respect to light-reflective material 18 of device 10. It is noted, however, that a dome is not needed for device 10' as it is for device 10 because materials 18' and 20' are rigid and do not require protection.

Figure 12:
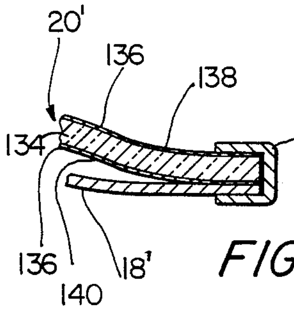
FIG. 12 is a side elevational view of the embodiment of FIG. 10, partially cut away.
Figure 11:
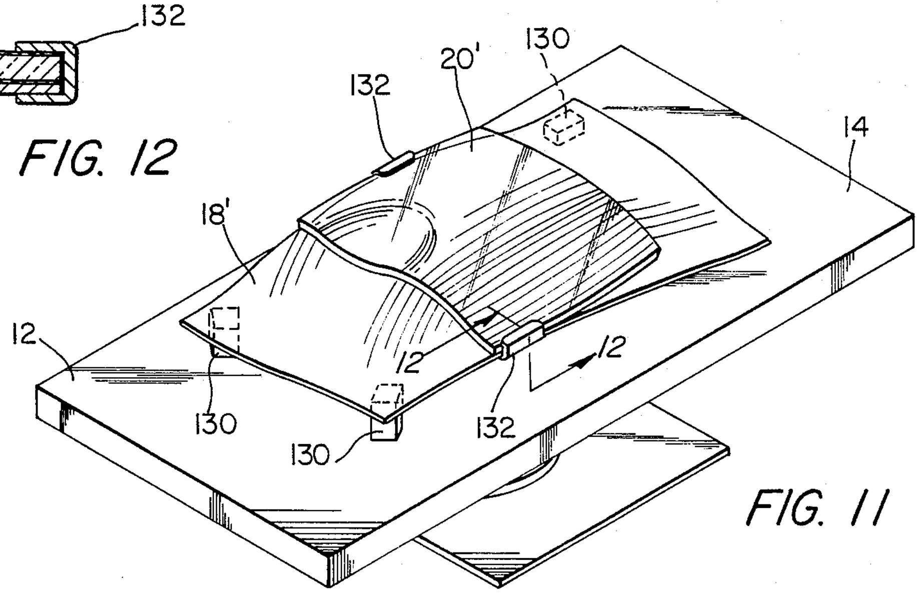
FIG. 11 is an enlarged perspective view of the embodiment of FIG. 10.

In order to create a decorative light image I', material 20' as illustrated in FIG. 12 comprises a rigid, transparent material such as plastic or glass 134 having a dielectric coating 136 on its top or bottom surfaces 138 and 140 or both; material 20' can also comprise stained glass. The glass or plastic 134 is shaped to produce a reflected light image by bending. The bending must be controlled, or the reflected light image will spread out too much. The amount of bending determines how focused the final image I' will be at a distance; the greater the amount of bending, the closer the device 10' must be to surface S. Because material 20' is rigid, it is suitable for the production of multiples.

To bend glass for material 20', I have modified standard laboratory techniques used to sag or shape glass in a kiln. First, a piece of glass is cut to the desired size, for example 5 inches by 6 inches, and the edges are polished. Generally, I use glass ⅛ inch thick. Any kind of glass can be used, including regular float glass and high temperature glass. The glass is placed in a preheated kiln and braced at different points with supports, such as horizontally or vertically placed bars of aluminum oxide; the supports can be any material which will withstand the high temperatures of a kiln and will not discolor the glass. The placement of the supports and whether they are horizontal or vertical determines where the glass will sag. The glass is then slowly heated to the softening point and allowed to sag over the supports. I have found a temperature of about 640° F., and soak times from about 15 to 25 minutes at that temperature to produce satisfactory results. The amount of sagging is checked repeatedly until the glass has achieved the desired shape. Then the heat is turned off and the glass is annealed. This technique provides reproducible results for the production of multiples.

The sagged glass 134 will reflect light onto a surface S in an image I' dependent upon the shape of the glass. Color is added to the image I' either by color incorporated into glass 134, as when stained glass is used, or by addition of a dielectric coating 136, to produce the finished material 20'. If a dielectric coating 136 is used, then the color of image I' will shift as the angle of sunlight changes.

As one example, I have used for coating 136 electron beam deposited, short-wave length transmitting dielectrics similar to those used to make short wave pass dichroic beam splitters. Such coatings are commercially produced by CVI Laser Corp. of Albuquerque, N.M. However, in a dichroic beam splitter, a highly even, regular surface is used as the substrate, and a highly even coating results. In my device 10', surfaces 138 and 140 of glass or plastic 134 are uneven, and a highly uneven coating results, producing an iridescent (light interference) effect.

In operation, the combination decorative light image source and calendrical device 10, 10', or 50 is placed in a location where it can receive direct sunlight. As the sunlight strikes the optical elements (i.e., light-reflective material 18, flexible film 20, and light-reflective and transmissive material 22; light-reflective material 18' and light-reflective, transmissive, and reflective material 20'; or first and second materials 52 and 62) an image is formed on the surrounding surfaces, e.g., walls, floor, and ceiling indoors or walls and ground outdoors. The nature of the image formed, including the shape and the colors, depends upon which optical element or elements the sunlight is striking, the positions of the optical elements with respect to each other, the composition of the optical elements, and the angle of incidence. As an example, if the combination decorative light image source and calendrical device 10, 10', or 50 is positioned to reflect the sunlight onto a wall, the image will travel across the wall as the sun passes over head. During the course of the year, the position of the image will shift upwards and downwards on the wall. If it is desired to maintain the image at the same level on the wall, the base 32 can be adjusted to compensate for the change in the sun's position through the year.

When direct sunlight is not available due to weather conditions or time of day, artificial light can be directed at combination decorative light image source 10, 10', or 50 to provide a decorative light image. The artificial light source can be arranged to itself move, or to include an aperture or other means which changes the amount of light given off, so that the decorative light images change. It is even possible to construct an artificial light source which moves to simulate the movement of the sun, in order to simulate the calendrical aspects of combination decorative light image source and calendrical device 10, 10', or 50.

Thus, it will be seen that all embodiments of the present invention provide a unique apparatus for creating decorative light images and marking the passage of time. While preferred embodiments have been disclosed, it should be understood that the spirit and scope of the invention are to be limited solely by the appended claims, since numerous modifications of the disclosed embodiments will occur to those of skill in the art.

I claim:

1. A combination decorative light image source and calendrical device for use near an image surface, comprising:

a substantially planar platform having a top surface and a bottom surface;

flexible film means positioned above said top surface of said platform for reflecting, transmitting, and refracting light said flexible film means being bent into a plurality of irregular, very shallow, continuously curved surfaces, whereby parallel rays of light passing through or reflected by said shallow curved surfaces will remain nearly parallel; and transparent cover means affixed to said platform for enclosing said top surface of said platform and said flexible film means;

whereby when said device is placed in direct sunlight, a focused and reflected decorative light image is formed in the image surface by the reflection, transmission, and refraction of the sunlight by said flexible film means, the decorative light image travelling across the surface and changing in appearance as the image position of the sun changes, thereby indicating the passage of time.

2. The combination decorative light image source and calendrical device of claim 1, further comprising a light-reflective material positioned on said top surface of said platform under, said flexible film means, the decorative light image further being formed by the reflection of the sunlight by said light-reflective material.

3. The combination decorative light image source and calendrical device of claim 2, wherein said light-reflective material is a plastic treated to reflect light.

4. The combination decorative light image source and calendrical device of claim 3, wherein said light-reflective material is a material selected from the group consisting of polyimide film, lacquered polyvinyl chloride, and metalized polyester.

5. The combination decorative light image source and calendrical device of claim 2, wherein said light-reflective material is formed with a planar surface bent to also focus light.

6. The combination decorative light image source and calendrical device of claim 2, wherein said light-reflective material is a metal having a shiny surface.

7. The combination decorative light image source and calendrical device of claim 6, wherein said metal is a material selected from the group consisting of steel, bronze, brass, aluminum, copper, tin, silver, silver plate, gold, and gold plate.

8. The combination decorative light image source and calendrical device of claim 2, further comprising a light-reflective and transmissive material at least a portion of which is positioned between said light-reflective material and said flexible film means, the decorative light image further being formed by the reflection and transmission of the sunlight by said light-reflective and transmissive material.

9. The combination decorative light image source and calendrical device of claim 8, wherein said light-reflective and transmissive material is a plastic.

10. The combination decorative light image source and calendrical device of claim 9, wherein said light-reflective and transmissive material is a polyimide film.

11. The combination decorative light image source and calendrical device of claim 8, wherein said light-reflective and transmissive material is formed with a planar surface bent to also focus light.

12. The combination decorative light image source and calendrical device of claim 1, wherein said flexible film means also causes light interference.

13. The combination decorative light image source and calendrical device of claim 1, wherein said flexible film means is a plastic.

14. The combination decorative light image source and calendrical device of claim 1, said flexible film means comprising a plurality of microlayers of at least two different polymers having different indices of refraction.

15. The combination decorative light image source and calendrical device of claim 1, wherein said flexible film means is folded into at least two at least partially spaced-apart layers.

16. The combination decorative light image source and calendrical device of claim 1, further comprising base means attached to said bottom surface of said platform for rotating said platform in at least one plane, whereby the position of the decorative light image on the surface can be adjusted.

17. The combination decorative light image source and calendrical device of claim 16, said base means allowing rotation of said platform around a line perpendicular to and passing through the plane of said platform.

18. The combination decorative light image source and calendrical device of claim 16, said base means allowing rotation of said platform around a line parallel to a line in the plane of said platform.

19. The combination decorative light image source and calendrical device of claim 16, said base means allowing rotation of said platform around a line perpendicular to and passing through the plane of said platform and around a line parallel to a line in the plane of said platform.

20. The combination decorative light image source and calendrical device of claim 16, said base means comprising a tripod head.

21. The combination decorative light image source and calendrical device of claim 1, wherein said cover means is formed of thermoformed acrylic plastic sheet.

22. The combination decorative light image source and calendrical device of claim 1, wherein at least one surface of said cover means has an anti-reflective coating.

23. The combination decorative light image source and calendrical device of claim 22, wherein said anti-reflective coating comprises a multi-layer broad band low-reflection coating.

24. The combination decorative light image source and calendrical device of claim 1, wherein said flexible film means is folded into at least two layers which are at least partially spaced apart.

25. A combination decorative light image source and calendrical device for use near an image surface, comprising:

a first rigid material for reflecting light;

first mounting means for mounting said first material to a support surface;

a second rigid material for reflecting, transmitting, and refracting light; and second mounting means for mounting said second material to a support surface, spaced apart from and over said first material;

whereby when said device is placed in direct sunlight, a decorative light image is formed on the image surface by the reflection of the sunlight by said first rigid material and the reflection, transmission, and refraction of the sunlight by said second rigid material, the decorative light image travelling across the image surface and changing in appearance as the position of the sun changes, thereby indicating the passage of time.

26. The combination decorative light image source and calendrical device of claim 25, wherein said first material is a metal having a shiny surface.

27. The combination decorative light image source and calendrical device of claim 26, wherein said metal is a material selected from the group consisting of steel, bronze, brass, aluminum, copper, tin, silver, silver plate, gold, and gold plate.

28. The combination decorative light image source and calendrical device of claim 25, wherein said first material is formed with a planar surface bent to also focus light.

29. The combination decorative light image source and calendrical device of claim 27, said base means including means for rotating said platform around a line perpendicular to the plane of said platform and around a line parallel to a line in the plane of said platform.

30. The combination decorative light image source and calendrical device of claim 28, said base means comprising a tripod head.

31. The combination decorative light image source and calendrical device of claim 25, wherein said second material is a material selected from the group consisting of dielectrically-coated glass, stained glass, architectural glass, pressed glass, blown glass, sagged glass, etched glass, cut glass, molded glass, thermoformed plastic, plastic sheet, colored plastic, etched plastic, pressed plastic, and dielectrically-coated plastic.

32. The combination decorative light image source and calendrical device of claim 25, wherein said second material is a polished stone.

33. The combination decorative light image source and calendrical device of claim 25, wherein said first mounting means comprises angling means for rotating said first material in a plurality of planes.

34. The combination decorative light image source and calendrical device of claim 33, further comprising a means for adjusting the height of said mounting means.

35. The combination decorative light image source and calendrical device of claim 33, further comprising means having a longitudinal axis for rotating said angling means about said longitudinal axis.

36. The combination decorative light image source and calendrical device of claim 24, further comprising a platform having a top surface and a bottom surface, said first mounting means being attached to said top surface of said platform.

37. The combination decorative light image source and calendrical device of claim 36, further comprising base means attached to said bottom surface of said platform for rotating said platform in at least one plane.

38. The combination decorative light image source and calendrical device of claim 36, said base means including means for rotating said platform around a line perpendicular to the plane of said platform.

39. The combination decorative light image source and calendrical device of claim 36, said base means including means for rotating said platform around a line parallel to a line in the plane of said platform.

40. A combination decorative light image source and calendrical device for use near a surface, comprising:

a first rigid material for reflecting light;

first attaching means for attaching said first material to a support surface;

a second rigid material for reflecting, transmitting, and refracting light; and second attaching means for attaching said second material to the support surface, spaced apart from and over said first material;

whereby when said device is placed in direct sunlight, a decorative light image is formed on the surface by the reflection of the sunlight by said first rigid material and the reflection, transmission, and refraction of the sunlight by said second rigid material, the decorative light image travelling across the surface and changing in appearance as the position of the sun changes, thereby indicating the passage of time.

41. A combination decorative light image source and calendrical device for use near an image surface, comprising:

a substantially planar platform having a top surface and a bottom surface;

a rigid, light-reflective, transmissive, and refractive material attached to said top surface of said platform and having top and bottom surfaces formed in a plurality of irregular, very shallow, continuously curved surfaces; and a light-reflective material at least a portion of which is positioned beneath said light-reflective, transmissive, and refractive material;

whereby, when said device is placed in direct sunlight, a focused and reflected light image is formed on the image surface by the reflection, transmission, and refraction of the sunlight by said rigid, light-refractive, transmissive, and refractive material and the reflection of the sunlight by said light-reflective material, the decorative light image travelling across the image surface and changing in appearance as the position of the sun changes, thereby indicating the passage of time.

42. The combination decorative light image source and calendrical device of claim 41, wherein said light-reflective material is a plastic treated to reflect light.

43. The combination decorative light image source and calendrical device of claim 42, wherein said light-reflective material is a material selected from the group consisting of polyamide film, lacquered polyvinyl chloride, and metalized polyester.

44. The combination decorative light image source and calendrical device of claim 41, wherein said light-reflective material is formed with a planar surface bent to also focus light.

45. The combination decorative light image source and calendrical device of claim 41, wherein said light-reflective material is a metal having a shiny surface.

46. The combination decorative light image source and calendrical device of claim 45, wherein said metal is a material selected from the group consisting of steel, bronze, brass, aluminum, copper, tin, silver, silver plate, gold, and gold plate.

47. The combination decorative light image source and calendrical device of claim 41, wherein said rigid, light reflective, transmissive, and refractive material is a material selected form the group consisting of plastic and glass.

48. The combination decorative light image source and calendrical device of claim 47, wherein said plastic or glass is coated with a dielectric coating having an uneven thickness.

49. The combination decorative light image source and calendrical device of claim 41, said rigid, light-reflective, transmissive, and refractive material comprising stained glass.

50. The combination decorative light image source and calendrical device of claim 41, further comprising base means attached to said bottom surface of said platform for rotating said platform in at least one plane, whereby the position of the decorative light image on the surface can be adjusted.

51. The combination decorative light image source and calendrical device of claim 50, said base means allowing rotation of said platform around a line perpendicular to and passing through the plane of said platform.

52. The combination decorative light image source and calendrical device of claim 49, said base means allowing rotation of said platform around a line parallel to a line in the plane of said platform.

53. The combination decrative light image source and calendrical device of claim 49, said base means allowing rotation of said platform around a line perpendicular to and passing through the plane of said platform and around a line parallel to a line in the plane of said platform.

54. The combination decorative light image source and calendrical device of claim 49, said base means comprising a tripod head.

55. A combination decorative light image source and calendrical device for use near an image surface, comprising:

a substantially planar platform having a top surface and a bottom surface;

flexible film means positioned above said top surface of said platform for reflecting, transmitting, and refracting light, said flexible film means being bent into a plurality of irregular, alternating curved and substantially planar sections, adjacent planar sections being at angles to each other, the size of said planar sections being sufficiently large and the angles between adjacent planar sections being sufficiently small, whereby when said device is placed in direct sunlight, a focused and reflected decorative light image is formed on the image surface by the reflection, transmission, and refraction of the sunlight by said flexible film means, the decorative light image travelling across the image surface and changing in appearance as the position of the sun changes, thereby indicating the passage of time; and transparent cover means affixed to said platform for enclosing said top surface of said platform and said flexible film means.

56. A combination decorative light image source and calendrical device for use near an image surface, comprising:

a substantially planar platform having a top surface and a bottom surface; and a rigid, light-refractive, transmissive, and refractive material attached to said top surface of said platform and having top and bottom surfaces formed in a plurality of irregular, very shallow, continuously curved surfaces;

whereby when said device is placed in direct sunlight, a focused and reflected light image is formed on the image surface by the reflection, transmission, and refraction of the sunlight by said rigid, light-reflective, transmissive, and refractive material, the decorative light image travelling across the image surface and changing in appearance as the position of the sun changes, thereby indicating the passage of time.

57. The combination decorative light image source and calendrical device of claim 56, wherein said rigid, light reflective, transmissive, and refractive material is a material selected from the group consisting of plastic and glass.

58. The combination decorative light image source and calendrical device of claim 57, wherein said plastic or glass is coated with a dielectric coating having an uneven thickness.

59. The combination decorative light image source and calendrical device of claim 56, said rigid, light-reflective, transmissive, and refractive material comprising stained glass.

60. The combination decorative light image source and calendrical device of claim 56, further comprising base means attached to said bottom surface of said platform for rotating said platform in at least one plane, whereby the position of the decorative light image on the surface can be adjusted.

61. The combination decorative light image source and calendrical device of claim 60, said base means allowing rotation of said platform around line perpendicular to and passing through the plane of said platform.

62. The combination decorative light image source and calendrical device of claim 60, said base means allowing rotation of said platform around a line parallel to a line in the plane of said platform.

63. The combination decorative light image source and calendrical device of claim 60, said base means allowing rotation of said platform around a line perpendicular to and passing through the plane of said platform and around a line parallel to a line in the plane of said platform.

64. The combination decorative light image source and calendrical device of claim 60, said base mean comprising a tripod head.

* * * * *